United States Patent
Huang

Patent Number: 6,142,399
Date of Patent: Nov. 7, 2000

[54] SEASONING CONTAINER HAVING MODULAR COMPONENTS

[76] Inventor: Hsien-Yang Huang, 10F-2, No. 341, Sec. 4, Chung Hsiao E. Rd., Taipei, Taiwan

[21] Appl. No.: 09/265,431

[22] Filed: Mar. 10, 1999

[51] Int. Cl.[7] .................................................. A47J 42/04
[52] U.S. Cl. ........................................................... 241/169.1
[58] Field of Search ............................... 241/169.1, 169, 241/169.2; 222/142.1–142.7

[56] References Cited

U.S. PATENT DOCUMENTS

| | | | |
|---|---|---|---|
| 3,633,834 | 1/1972 | Nissen | 241/169.1 |
| 4,771,954 | 9/1988 | Poncy | 241/169.1 |

*Primary Examiner*—Mark Rosenbaum
*Attorney, Agent, or Firm*—Dougherty & Troxell

[57] ABSTRACT

A seasoning container including a plastic molded main body for holding granular seasonings, a grinding mechanism sealed in the main body for grinding the granular seasonings into powder for directly sprinkling over food, a turning knob connected to an upper end of the grinding mechanism projected from a top of the main body for manually controlling the grinding mechanism, and a shell made of sheet material and removably mounted around the main body. The main body further includes vertically connected lower and upper cylinders that may be freely shortened or extended in length to provide different height for the main body. The shell is removably connected at upper and lower end to receiving grooves formed around upper and lower peripheries of the upper and the lower cylinders, respectively. Differently shaped shells may be selected for mounting around similarly structured main body during the manufacturing process to easily create seasoning containers of different appearances at reduced cost.

1 Claim, 7 Drawing Sheets

SEASONING CONTAINER HAVING MODULAR COMPONENTS

BACKGROUND OF THE INVENTION

The present invention relates to a seasoning container, and more particularly to a seasoning container for holding granular seasonings. The seasoning container is provided with a grinding mechanism for grinding the granular seasonings into powder for directly sparkling over food, and has a removable shell that can be differently designed so that each selection of a different shell for mounting around the main body may give the seasoning container a different appearance.

There are various types of seasoning containers available in the markets. One of these seasoning containers is designed for holding granular seasonings, such as black pepper and salt. A grinding mechanism is provided in the seasoning container and can be rotated by a user to grind the granular seasonings in the seasoning container into powder for sparkling over food. Such seasoning container with grinding mechanism tends to maintain the flavor of seasonings for a prolonged time and is usually found in big-scale restaurants.

As shown in FIG. 7, most commercially available seasoning containers, either with or without the grinding mechanism, are integrally molded and therefore require a large quantity of material to form them. These conventional seasoning containers usually have a thick and heavy shell 40 that has a fixed shape decided at the time of molding. That is, the conventional seasoning containers have fixed appearance once a mold has been selected for them. One mold can only produce one monotonous type of seasoning container, and no part included in the seasoning container can be replaced with parts of seasoning containers made from other molds. Moreover, to facilitate production through molding, the conventional seasoning containers are usually made of materials that are easy to mold, such as glass and plastics. Metallic material that has beautiful and bright luster but is expensive and difficult to fabricate is normally not selected for making seasoning containers. Moreover, metals are subject to chemical and/or physical changes after contacting with some seasonings, such as salt, for a long time. Such chemical and/or physical changes of the metallic materials might sometimes have adverse influence on human beings. All these factors have prevented manufacturers from developing novel, economical, and practical seasoning containers, particularly those with metal shells.

SUMMARY OF THE INVENTION

It is therefore a primary object of the present invention to provide a seasoning container having a main body integrally formed from plastic material, and a shell made of sheet metallic material and removably connected to the main body. The removable connection of the shell to the main body of the seasoning container allows for changeable appearance of the seasoning container while the sheet metallic material of the shell allows for reduced manufacturing cost of the seasoning container.

Another object of the present invention is to provide a seasoning container having a main body that includes two vertically connected cylinders formed from integrally molded plastic material. The vertical connection of the two cylinders of the main body allows for easy production of seasoning containers of different heights simply by properly shortening or extending the length of the cylinders without the need of making new molds.

A further object of the present invention is to provide a seasoning container having separated main body and shell. The shell is removably mounted around the main body and would not contact with seasonings held in the main body to cause any chemical and/or physical changes in the seasonings. And, the shell can therefore include more than one type of material that may be freely arranged in different manners to create unique appearance for the seasoning container.

DETAILED DESCRIPTION OF THE PREFERRED EMBODIMENTS

Figure 1:
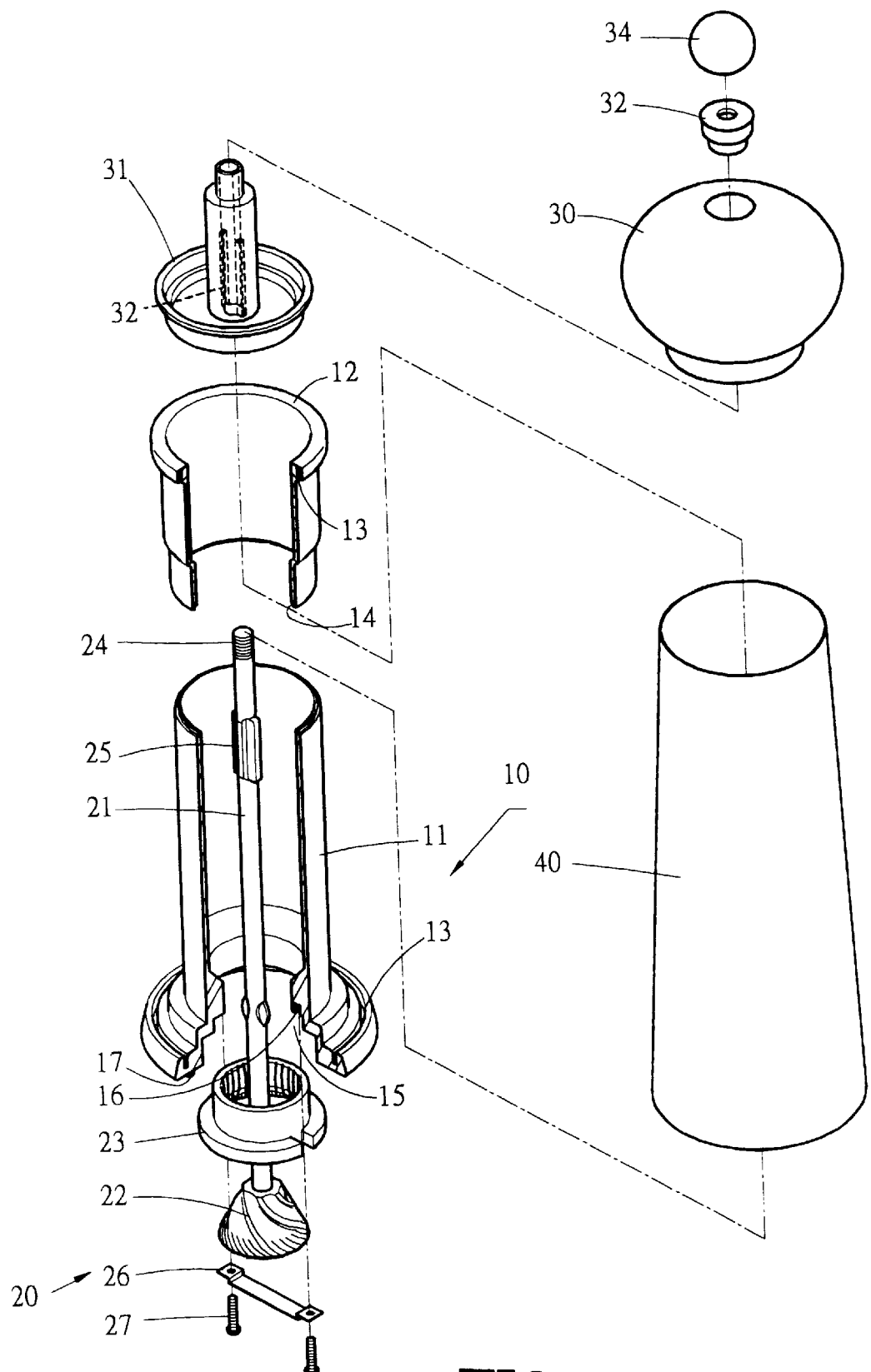
FIG. 1 is an exploded perspective of a seasoning container according to an embodiment of the present invention.
Figure 3:
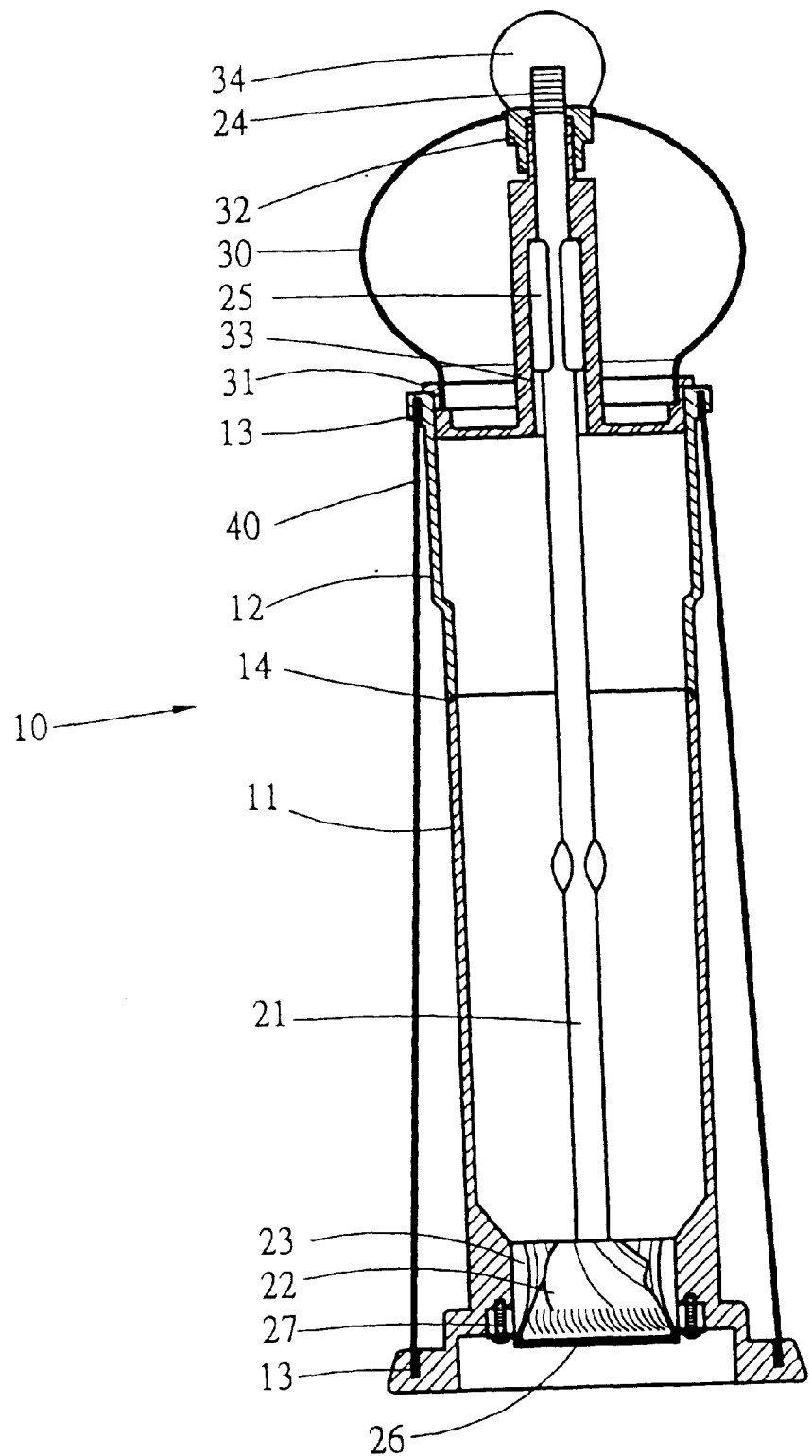
FIG. 3 is a vertical sectional view of the seasoning container of FIG. 2.

Please refer to FIGS. 1 and 3 that are exploded perspective and assembled sectional views, respectively, of a seasoning container according to an embodiment of the present invention. As shown, the seasoning container mainly includes a main body 10, a grinding mechanism 20, a turning knob 30, and a shell 40.

The main body 10 is not limited to any fixed height and includes a lower cylinder 11 and an upper cylinder 12 that all are made of non-toxic non-metallic material and connected to each other end to end. The lower cylinder 11 is provided around its lower periphery with an upward opened receiving groove 13 and around its upper periphery with connection means 14. Similarly, the upper cylinder 12 is provided around its upper periphery with a downward opened receiving groove 13 and around its lower periphery with connection means 14. The connection means 14 on the lower and the upper cylinders 11, 12 may be corresponding threads for the two cylinders to screw together, or two complementary edges allowing the two cylinders to join flush by means of radio-heating. The lower cylinder 11 defines a cavity 15 in its lower part. Two vertically extended and diametrically opposite threaded holes 16 are provided on a wall around the cavity 15. A non-slip pad 17 is attached to a bottom surface of the lower cylinder 11 for the same to stand stably.

The grinding mechanism 20 is disposed in the main body 10 and includes a transmission shaft 21, a grinding wheel 22 connected to a lower end of the transmission shaft 21, and a grinding ring 23 corresponding to and located above the grinding wheel 22. The transmission shaft 21 is provided around its upper end with a thread 24. A locating means 25 is also provided around the transmission shaft 21 at some distance below the thread 24. A stopping plate 26 is fixed to a lower end of the lower cylinder 11 by screws 27 upward screwed into the two threaded holes 16 on the wall of the cavity 15 in the lower part of the lower cylinder 11. When the screws 27 extend through an outer periphery of the grinding ring 23, they also fixedly locate the grinding ring 23 in the cavity 15 to fitly contact with the grinding wheel 22. Whereby when the transmission shaft 21 is caused to rotate, the grinding wheel 22 connected to its lower end also rotates relative to the grinding ring 23 fixedly located in the cavity 15.

The turning knob 30 includes a plug member 31 fixedly connected to a lower part thereof and a fixing ring member 32 downward inserted into a top hole of the turning knob 30 to connect to an upper end of the plug member 31. The plug member 31 is tightly fitted in an upper end of the upper cylinder 12 to seal a top of the main body 10. The plug member 31 has a centered through hole 33 for tightly receiving the locating means 25 provided around the transmission shaft 21. The upper end of the transmission shaft 21 upward projects from the fixing ring member 32 on the top of the turning knob 30 and is decorated with an ornament 34 firmly screwed onto the thread 24. Whereby, when the turning knob 30 is manually turned, the transmission shaft 21 is brought to rotate and cause the grinding wheel 22 to rotate relative to the fixed grinding ring 23.

The shell 40 is mounted around the main body 10 with its lower and upper ends separately engaged with the receiving grooves 13 of the lower and the upper cylinders 11, 12. The shell 40 may be of any shape, so long as its lower and upper ends can engage with the receiving grooves 13.

Figure 2:
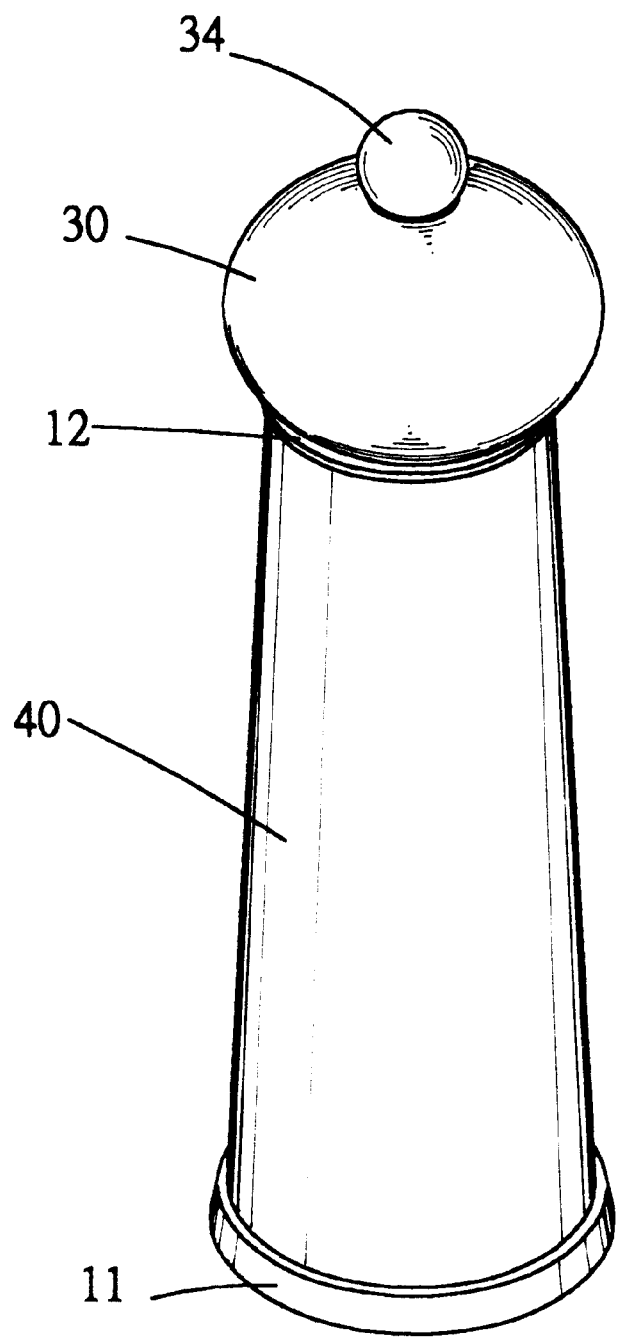
FIG. 2 is an assembled perspective of the seasoning container of FIG. 1.

FIG. 2 is an assembled perspective of a seasoning container according to the embodiment of the present invention illustrated in FIGS. 1 and 3.

Figure 4:
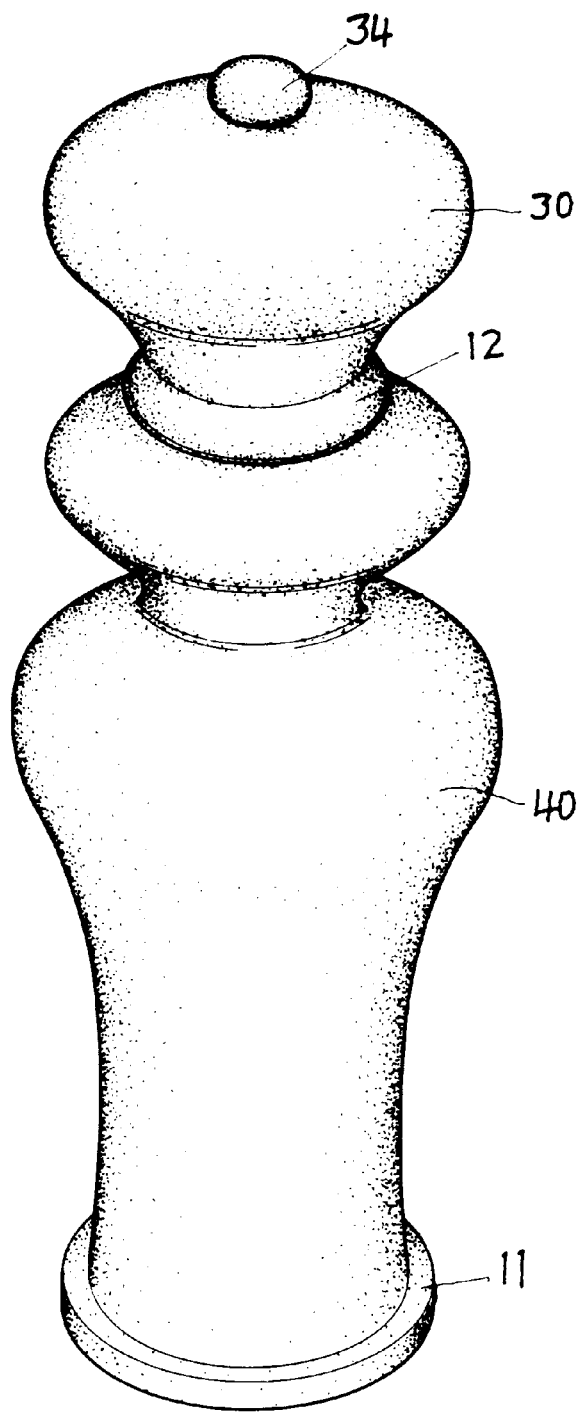
FIG. 4 is a seasoning container according to another embodiment of the present invention.
Figure 5:
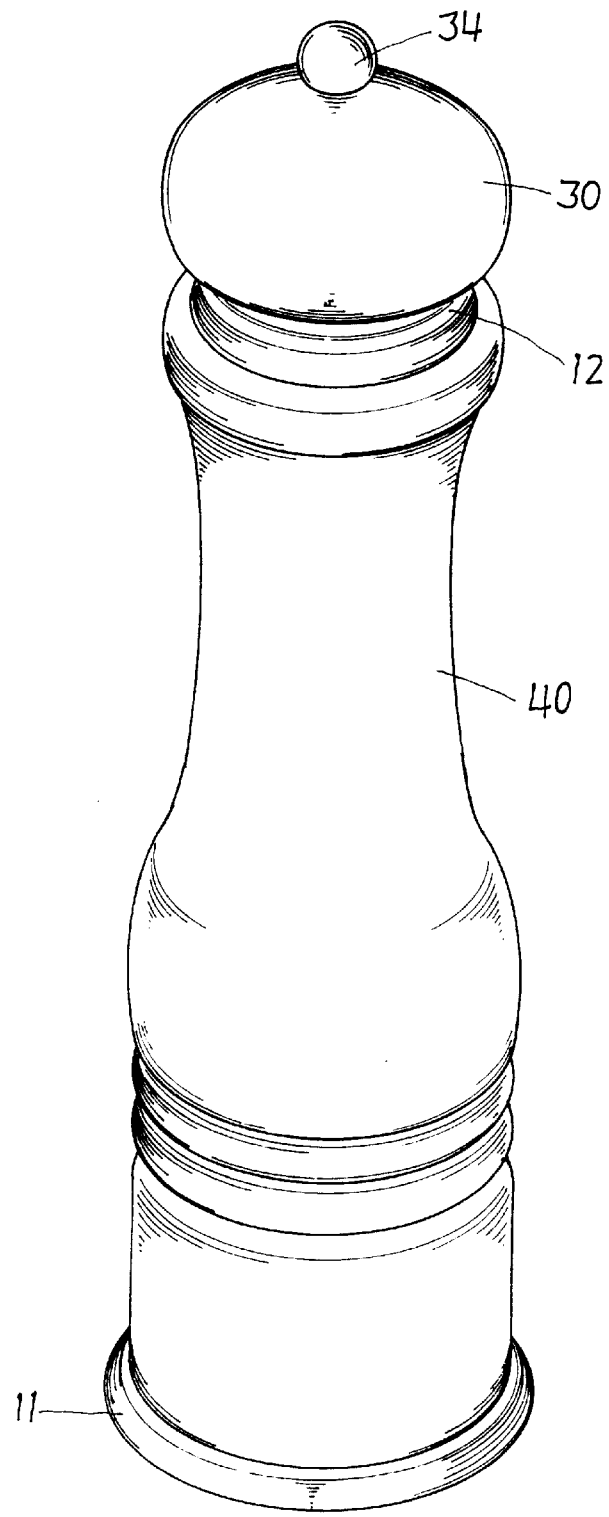
FIG. 5 is a seasoning container according to a further embodiment of the present invention.

The seasoning container of the present invention is characterized in that the main body 10 is formed from lower and upper cylinders 11, 12 integrally molded from non-toxic and non-metallic material, and the height of the main body 10 may be freely decided to meet different demands simply by cutting the lower and/or the upper cylinders 11, 12 to desired lengths or adding an additional cylinder having the same outer diameter as that of the lower and the upper cylinders 11, 12 to lengthen the lower or the upper cylinders 11, 12, and that the shell 40 may be produced as differently shaped modules so that it may be freely selected for mounting around the main body 10 to provide more choices to consumers. FIGS. 4 and 5 illustrate two seasoning containers with differently shaped shells 40 while the main body 10 is the same. Similarly, the turning knob 30 may also be differently designed to create more changes in the appearance of the seasoning container. Whereby, the seasoning containers of the present invention may be advantageously produced by assembling modular parts (i.e. the lower and the upper cylinders 11, 12, and the shell 40) without the need of preparing a large quantity of stock for each differently shaped container. Costs for different molds for the shell 40 can also be reduced. This would reduce the overall manufacturing cost of the seasoning containers and make the same more competitive in the market.

Figure 6:
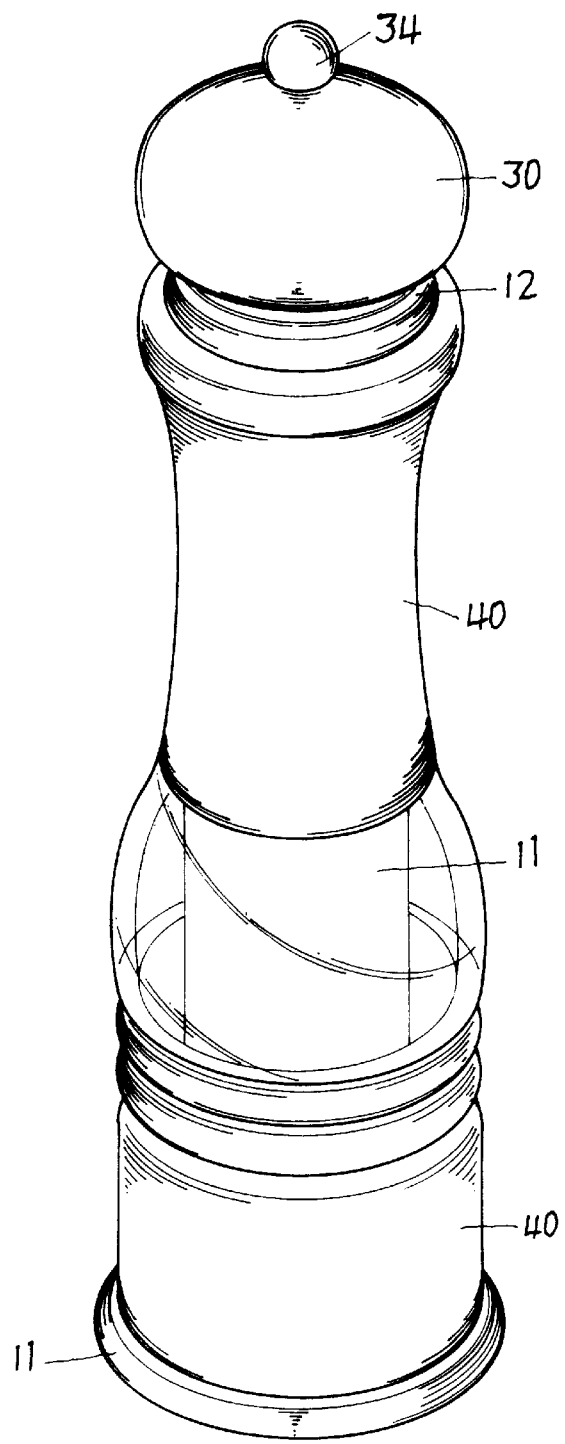
FIG. 6 is a seasoning container according to a still further embodiment of the present invention, wherein a shell of the seasoning container includes alternately arranged metallic and clear materials.
Figure 7:
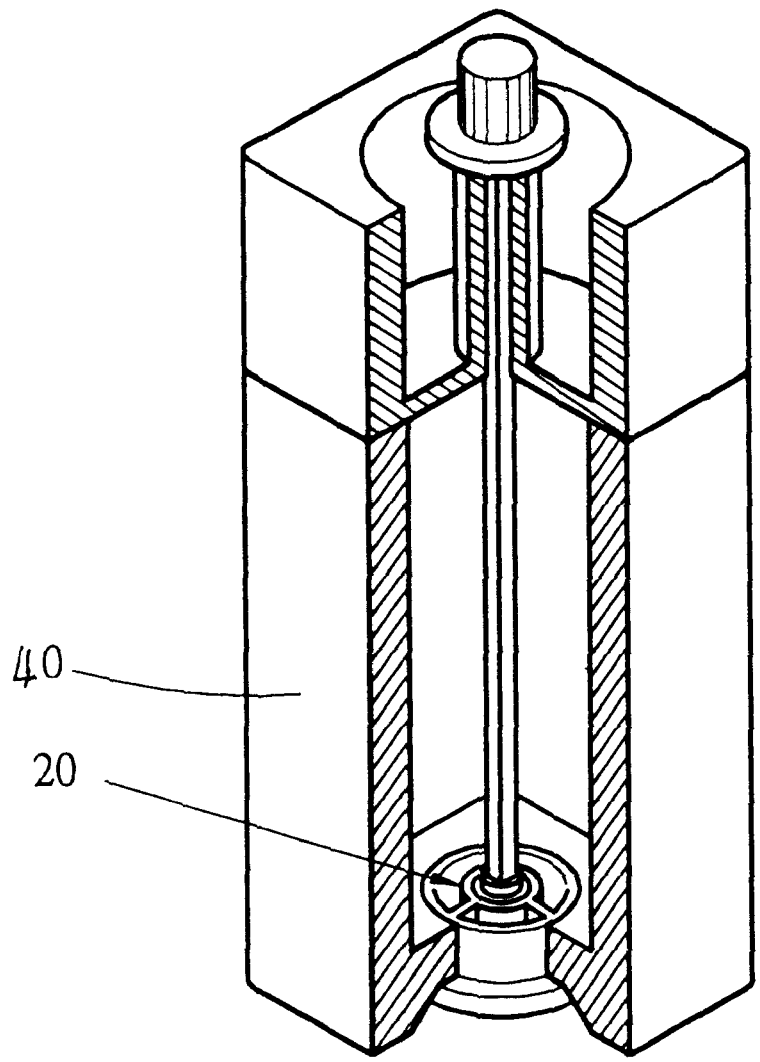
FIG. 7 is a perspective of a conventional seasoning container with a part thereof cut away to show a structure thereof.

It is to be noted that the shell 40 of the seasoning container according to the present invention is in no way in contact with any seasoning in the main body 10. Thus, it is possible to form the shell 40 from rolled sheet metallic material or other material with good touching. Or, more than one type of material may be freely arranged to form different patterns on the shell 40. FIG. 6 illustrates a seasoning container having a shell 40 that has upper and lower parts made of metallic materials and a middle part made of clear plastic material, giving the seasoning container a more changeful and attractive appearance. Moreover, since the shell 40 and the main body 10 are separately produced, the shell 40 may have reduced thickness and be more easily handled.

It is also to be noted that the grinding wheel 22 and the grinding ring 23 included in the grinding mechanism 20 of the present invention all are precision ceramic members that have a strength sufficient for grinding the seasoning in the main body 10 into fine particles or powder and would not cause any chemical change or oxidization of the seasoning and/or the material forming the main body 10. That is, the grinding mechanism 20 may have a prolonged usable life and is absolutely hazard-free to consumers. And, any cost that is otherwise needed for treating the surface of a metallic material can be saved.

What is claimed is:

1. A seasoning container comprising a main body for holding a certain kind of seasoning therein, a grinding mechanism disposed inside said main body for grinding the seasoning in said main body into fine particles, a turning knob located at a top of said main body and connected to said grinding mechanism for rotating said grinding mechanism, said main body including a base member with an upward opened receiving groove around its periphery and an upper portion with a downward facing receiving groove around its periphery, and a shell having upper and lower parts made of sheet metal and a middle part made of clear plastic material; wherein said lower part of said shell fits within said upward opened receiving grove and said upper part of said shell fits within said downward facing receiving groove to thereby maintain said shell about said main body whereby said shell is removably mounted to an outer side of said main body.

* * * * *